United States Patent
Orgeron et al.

(10) Patent No.: US 9,360,134 B2
(45) Date of Patent: Jun. 7, 2016

(54) SERVICE LINE TRANSPORT AND DEPLOYMENT SYSTEM

(71) Applicants: Keith J. Orgeron, Spring, TX (US); Darrell D. Jamison, Humble, TX (US); Mark W. Trevithick, Houston, TX (US)

(72) Inventors: Keith J. Orgeron, Spring, TX (US); Darrell D. Jamison, Humble, TX (US); Mark W. Trevithick, Houston, TX (US)

(73) Assignee: T & T Engineering Services, Inc., Tomball, TX (US)

(*) Notice: Subject to any disclaimer, the term of this patent is extended or adjusted under 35 U.S.C. 154(b) by 0 days.

(21) Appl. No.: 13/902,593

(22) Filed: May 24, 2013

(65) Prior Publication Data

US 2013/0315676 A1    Nov. 28, 2013

Related U.S. Application Data

(60) Provisional application No. 61/651,680, filed on May 25, 2012, provisional application No. 61/651,776, filed on May 25, 2012.

(51) Int. Cl.
| | |
|---|---|
| *E21B 7/00* | (2006.01) |
| *E21B 19/00* | (2006.01) |
| *F16L 1/024* | (2006.01) |
| *E21B 15/00* | (2006.01) |

(52) U.S. Cl.
CPC ............. *F16L 1/0243* (2013.01); *E21B 15/003* (2013.01)

(58) Field of Classification Search
CPC ...... E21B 19/084; E21B 19/087; E21B 7/023
USPC ................... 405/184.4; 137/615; 414/22.65; 175/162
See application file for complete search history.

(56) References Cited

U.S. PATENT DOCUMENTS

| | | | | |
|---|---|---|---|---|
| 3,311,142 A | * | 3/1967 | Bergstrom | 141/388 |
| 3,399,909 A | * | 9/1968 | Ambrose | 285/61 |
| 3,439,700 A | * | 4/1969 | Preston | 137/351 |
| 3,685,543 A | * | 8/1972 | Schwing et al. | 137/615 |
| 4,202,372 A | * | 5/1980 | Gibbons | 137/615 |
| 4,391,297 A | * | 7/1983 | Knight | 137/615 |
| 4,474,213 A | | 10/1984 | Jameson | |
| 5,755,296 A | | 5/1998 | Richardson et al. | |
| 6,024,181 A | | 2/2000 | Richardson et al. | |
| 6,913,097 B1 | | 7/2005 | Orr et al. | |
| 7,819,207 B2 | | 10/2010 | Cowan | |
| 7,832,974 B2 | | 11/2010 | Fikowski et al. | |
| 8,308,518 B1 | * | 11/2012 | Shivers et al. | 441/4 |
| 2006/0104746 A1 | | 5/2006 | Thompson | |
| 2009/0196711 A1 | | 8/2009 | Gerber et al. | |
| 2011/0132485 A1 | * | 6/2011 | Garceau | 138/106 |
| 2011/0188973 A1 | | 8/2011 | Baumler | |

OTHER PUBLICATIONS

Electro Mechanical Industries; Cables Management Systems; Sep. 20, 2011; All.*

* cited by examiner

*Primary Examiner* — Benjamin Fiorello
(74) *Attorney, Agent, or Firm* — John G. Fischer, Esq.; Scheef & Stone, L.L.P.

(57) ABSTRACT

An extendable, service line positioning system is provided for the deployment, retraction, and transportation of service lines that provide necessary resources (e.g., electrical, pneumatic, hydraulic, and communication resources) to a drilling rig. The positioning system comprises a plurality of connected panels supportable of a service line coupled to a vertical post on a skid. The panels are movable between a retracted position above the skid or a deployed position beyond the skid. The positioning system thus advantageously enables a drilling rig to move short distances for pad drilling operations without having the need to move resource-providing equipment coupled to supply lines.

17 Claims, 6 Drawing Sheets

SERVICE LINE TRANSPORT AND DEPLOYMENT SYSTEM

TECHNICAL FIELD OF INVENTION

The present invention relates to a positioning system for service lines. Generally, the invention relates to a mechanism for the deployment, retraction, and transportation of fixed-length service lines such as electrical, pneumatic, hydraulic, and communication resources necessary to the operation of a drilling rig used for subterranean exploration. More particularly, the invention provides an extendable cable positioning system for use with drilling rigs where pad drilling will require relatively short distance movements of the drilling rig and it is desirable to leave the energy resource systems stationary.

BACKGROUND OF THE INVENTION

It is an increasingly common practice in the drilling industry to engage in pad site drilling, where the drilling rig is moved a short distance to drill a subsequent hole only a few feet away from the previous well. This practice maximizes revenues from individual leases and significantly reduces the cost associated with the downtime, disassembly, transport, and re-assembly of the drilling rig.

Drilling rigs require energy of various types to be delivered to the drill floor, including electrical, pneumatic, and hydraulic energy. These energy sources are provided by generators and pumps located in housings located on skids or trailers adjacent to the drilling rig, but remote to the drilling floor. Other resources necessary to the drilling operation include communication paths. The energy and communication sources are transmitted between the generating houses to the drill floor by means of service lines, including tubes, pipes, conduits, cables, and the like. The service lines are normally a fixed length. Therefore, when a drilling rig is relocated between pads sites, it is necessary to relocate the energy source as well.

The distance between the generating source and the drilling rig spanned by the service lines is an obstacle to drilling operations. In particular, it is preferred to have vehicular access across the path of the service lines, without driving over and potentially damaging or destroying the service lines.

Another obstacle is the great weight of the collective service lines when run the distance between the connection source and the drilling rig. The distance may be as long as 150 feet, and the several service cables that run that distance will weigh tens of thousands of pounds.

Thus, there remains a need for improvements for the creation of a safe and reliable system for protecting service lines during drilling rig relocations on pad sites that permits the resource generating systems to remain stationary as the drilling rig is relocated to individual well locations.

In summary, the preferred embodiments of the present invention provide a unique solution to the engineering constraints and environmental challenges of providing a durable mechanically actuated steering system.

SUMMARY OF THE INVENTION

The present invention provides a novel system and method for the deployment, retraction, and transportation of fixed-length service lines such as electrical, pneumatic, hydraulic, and communication resources necessary to the operation of a drilling rig used for subterranean exploration. More particularly, the invention provides an extendable cable positioning system for use with drilling rigs where pad drilling will require relatively short distance movements of the drilling rig and it is desirable to leave the energy resource systems stationary.

In one embodiment of the service line positioning system, a transportable skid is provided and has a substantially vertical skid post. Panels are provided with at least one panel having at least one end pivotally connected to another panel. At least one panel is pivotally connected to the skid post. Each panel is supportable of service lines extending between the panels. The connected panels are movable between a retracted position above the skid and a deployed position that extends at least one panel beyond the skid.

In another embodiment, extension of the panels between the retracted position and extended position occurs in a substantially horizontal plane. In another embodiment, a first panel extends in a first direction from the skid, and a second panel extends in a second direction from the skid that is different from the first direction.

In another embodiment, the skid is mountable above ground level, such as on top of a structure, so as to provide clearance beneath at least one deployed panel sufficient to provide vehicular passage beneath the deployed panel.

In another embodiment, a latching mechanism is provided to secure a panel in the retracted position above the skid for transportation.

In another embodiment, the skid post is located proximate to a first end of the skid. A latch post is located proximate to an opposite second end of the skid. A panel is pivotally connected to the skid post on one end and releasably connected to the latch post on its opposite end. In another embodiment, the latch post supports a portion of the weight of the releasably connected panel when it is connected.

In another embodiment, a rig post is located between the base box and side box of a drilling rig. One of the panels has one end pivotally connected to the rig post. In another embodiment, a rig post is located between the base box and side box of a drilling rig. A panel is pivotally connectable to the rig post when the panel is in a deployed position. In another embodiment, the rig post is removably connectable to the drilling rig.

In another embodiment, a source post is located proximate to a source connection of the service lines. A panel has one end connected to the source post.

In another embodiment, a source post is located proximate to a source connection of the service lines. A panel is connectable to the source post when the panel is in a deployed position.

In another embodiment, the source post is connected to a structure, such that the weight of the structure counterbalances a portion of the weight of the panels deployed between the skid and the drilling rig.

In another embodiment, the source post is connected proximate to the center of gravity to a structure, such that the weight of the structure counterbalances the weight of the panels deployed between the skid and the drilling rig.

In another embodiment, a source post, skid post, and rig post are positioned in substantially vertical and substantially parallel orientation with respect to each other. The skid post is connected to a panel. The source post and rig post are each connectable to a panel.

In another embodiment, a source post, skid post, and rig post are positioned in substantially vertical and substantially parallel orientation with respect to each other. A panel is connectable between the source post and the skid post. At least two panels are connectable between the skid post and rig post.

In another embodiment, three panels are extendable into a deployed end-to-end configuration that extends at a length of at least 100 feet.

In another embodiment, four panels are extendable into a deployed end-to-end configuration that extends at a length of at least 150 feet.

In another embodiment, a transportable skid is provided, having a plurality of panels pivotally interconnected and attached thereto. The panels are retractable to a transportable position above the skid and extendable into a deployed end-to-end configuration that extends at a length of at least 100 feet. The panels are configured to support a plurality of continuous service lines.

As will be understood by one of ordinary skill in the art, the system disclosed may be modified somewhat and the same advantageous result obtained.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
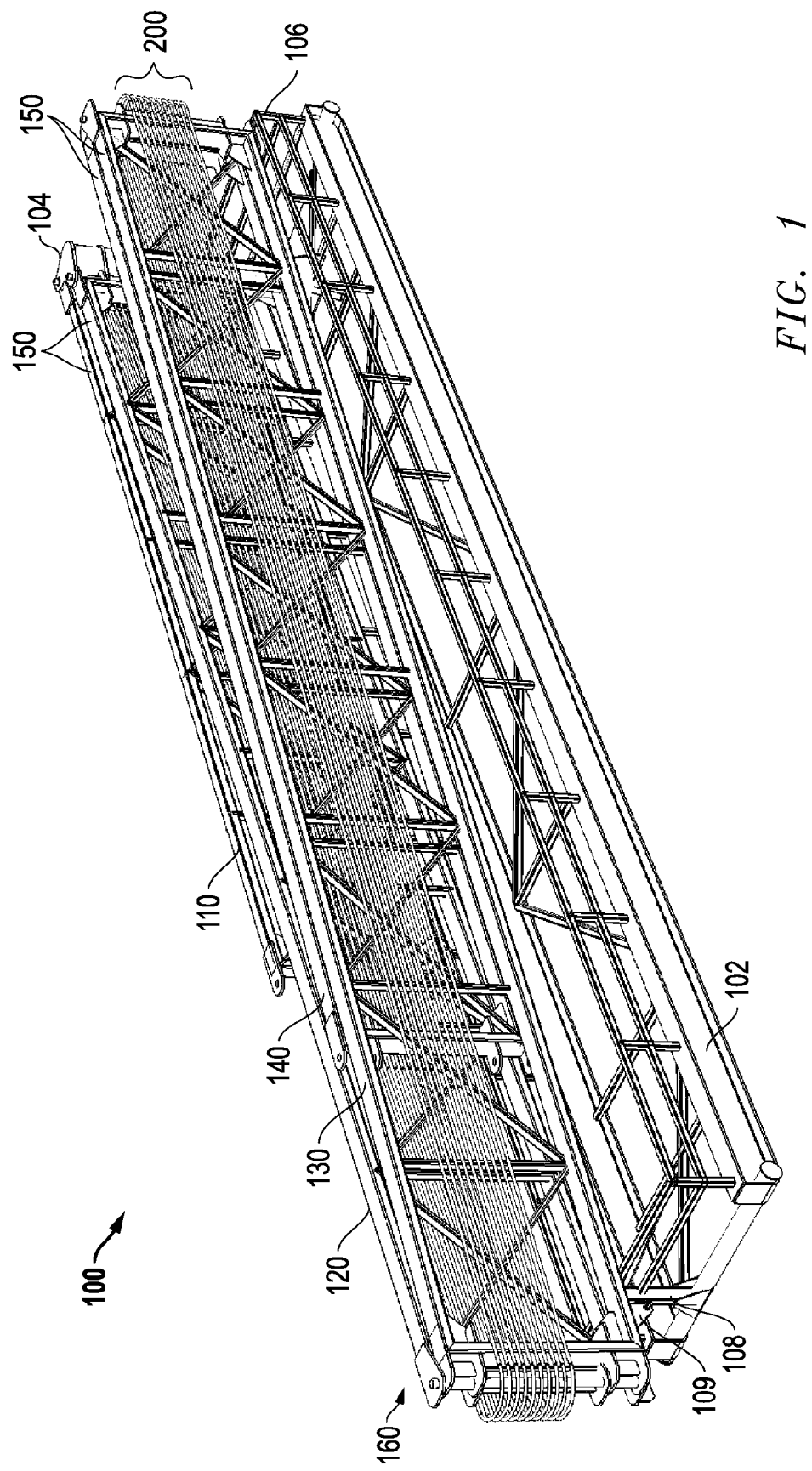
FIG. 1 is an isometric view of the service line positioning system having features of the present invention, illustrated in the retracted position above the skid for positioning on a trailer for transportation.

FIG. 1 is an isometric view of a service line positioning system (SLPS) 100 having features of the present invention. System 100 comprises a skid 102 that is mountable on a trailer for transportation between locations for drilling. A skid post 104 extends generally vertically upwards from skid 102. A plurality of panels 150 is located on skid 102. At least one of panels 150 is pivotally connected to skid post 104. Service lines 200 are attached to panels 150.

In FIG. 1, panels 150 are illustrated in the retracted position above a skid 102 for positioning on a trailer (not shown) for transportation. In the embodiment illustrated, panels 150 are retractable in a folding relationship such that service lines 200 are exterior to the folded connections between panels.

Panels 150 are connected in end-to-end series arrangement. Skid post 104 may be located in between two panels 150. Other posts or connecting devices may be located between other panels 150. In the embodiment illustrated, panels 150 fold at connection points in a manner that locates service lines 200 exterior to the vertex of each folded connection between panels 150.

A guide rail 106 may be provided around the perimeter of skid 102. In a preferred embodiment, guide rail 106 provides a vertical support for panels 150. Rails 106 may provide support for panels 150 when panels 150 are in the retracted position. Also, rails 106 may provide support for panels 150 when panels 150 are extended beyond the perimeter of skid 102.

Figure 2:
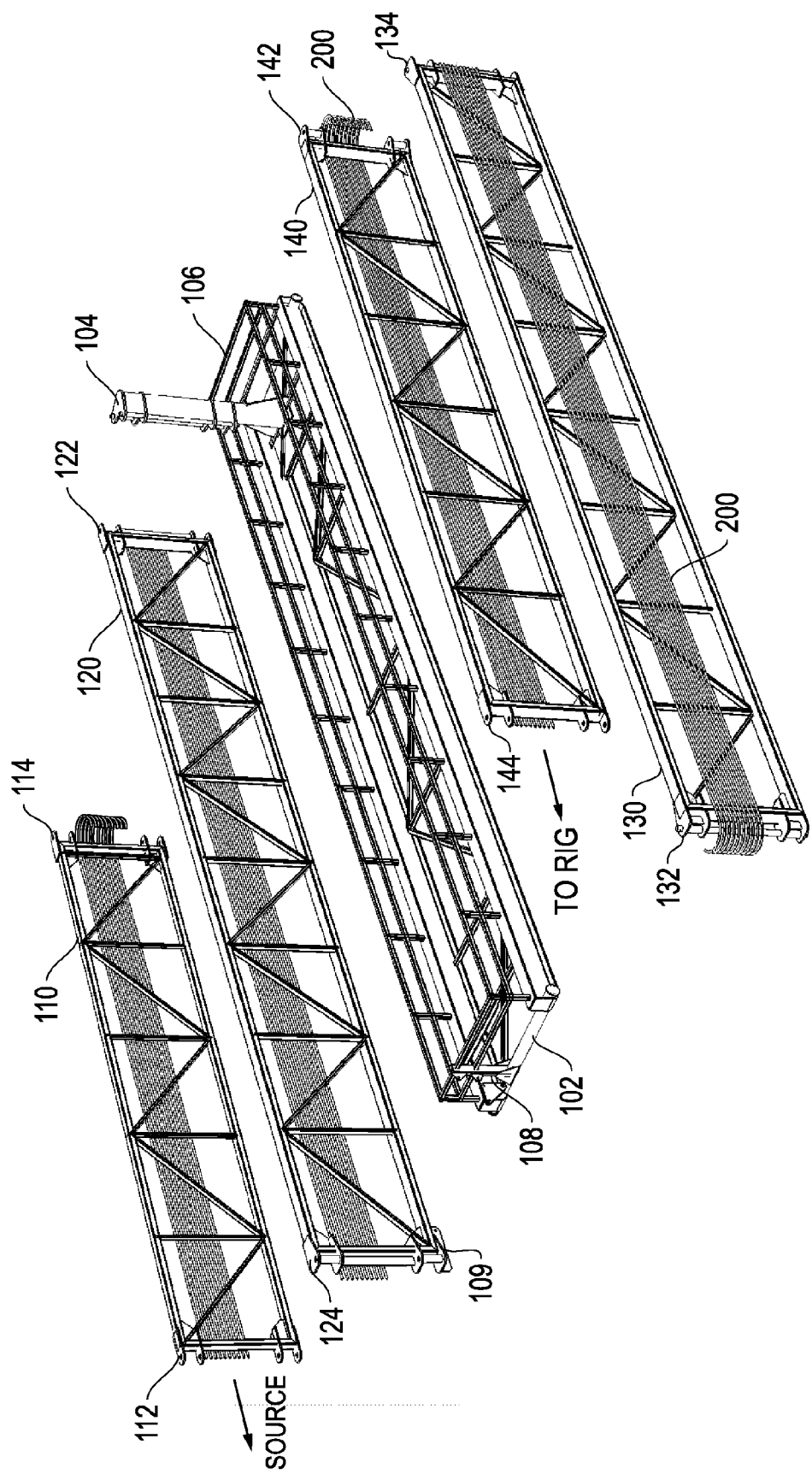
FIG. 2 is an exploded isometric view of the service line positioning system having features of the present invention.

FIG. 2 is an exploded isometric view of service line positioning system 100 having features of the present invention. In the embodiment illustrated, system 100 has four panels 150. Panels 150 are comprised of a first panel 110, having a first end 112 and an opposite second end 114; a second panel 120, having a first end 122 and an opposite second end 124; a third panel 130, having a first end 132 and an opposite second end 134; and a fourth panel 140, having a first end 142 and an opposite second end 144.

Service lines 200 extend in a continuous length between first panel 110, second panel 120, third panel 130, and fourth panel 140. In this embodiment, the source of the service in service lines 200 is connected to service lines 200 at the first end 112 of first panel 110. The far opposite end of service lines 200 is connected to a junction box at a drilling rig 40 (see FIG. 3).

As stated, panels 150 are connected in end-to-end series arrangement, although posts such as skid post 104 or other connective hardware may be located between the panel 150 connections. In this embodiment, second end 114 of first panel 110 is pivotally connected to skid post 104. First end 122 of second post 120 is also pivotally connected to skid post 104. First end 132 of third panel 130 is pivotally connected to second end 124 of second panel 120. First end 142 of fourth panel 140 is pivotally connected to second end 134 of third panel 130.

In another embodiment not illustrated, system 100 has three panels, being first panel 110, second panel 120, and third panel 130. In another embodiment not illustrated, system 100 has only two panels, being second panel 120, and third panel 130.

A latch post 108 may be attached to skid 102. Latch post 108 may provide vertical load support to one or more of panels 150 when panels 150 are in the retracted position for transportation. Latch post 108 provides a mechanism for ensuring one or more panels 150 are locked in place relative to skid 102 for transportation. A connecting strike 109 may be provided at the bottom of one or more panels 150 for engagement with latch post 108. There may alternatively be more than one latch post 108. It will be understood that strikes 109 and latch posts 108 are reversible in regards to their location.

Figure 3:
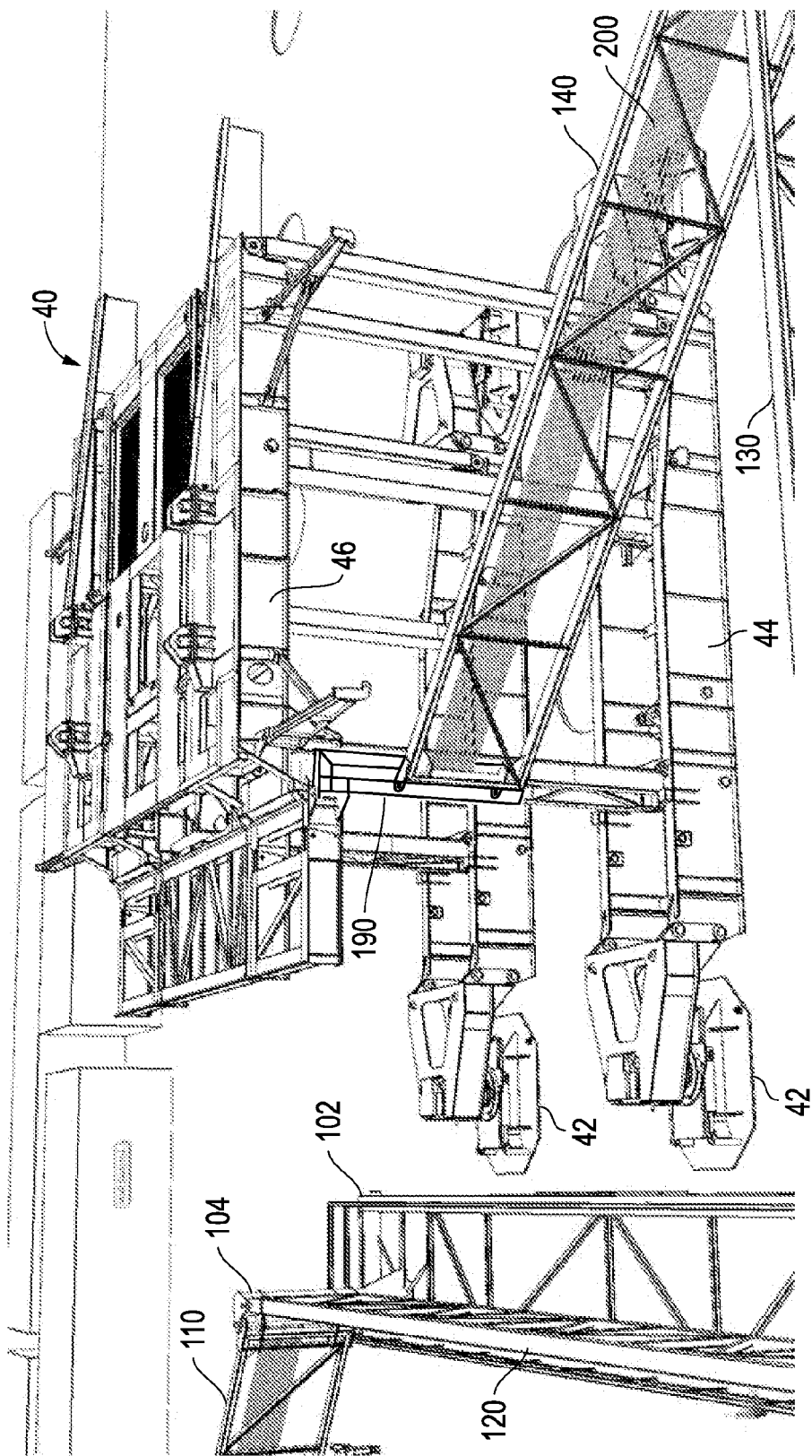
FIG. 3 is an isometric view of the service line positioning system, illustrated as connected between a drilling rig and a supply source and deployed over a nearby well bore.

FIG. 3 is an isometric view of service line positioning system 100, illustrated as connected to drilling rig 40. A rig post 190 is supported between a base box 44 and a side box 46 of drilling rig 40. Rig post 190 must be sufficiently sturdy to support a portion of the weight of system 100. Second end 144 of fourth panel 140 is pivotally connected to rig post 190. Rig post 190 may be advantageously irremovably attached to rig 40 to facilitate transportation of drilling rig 40.

Service lines 200 extend beyond second end 144 of fourth panel 140 for connection to a junction box, or for direct connection to the appropriate equipment receiving service line 200, such as a top drive, drawworks, control panel, or other device (service line 200 extension and connections not illustrated).

Figure 4:
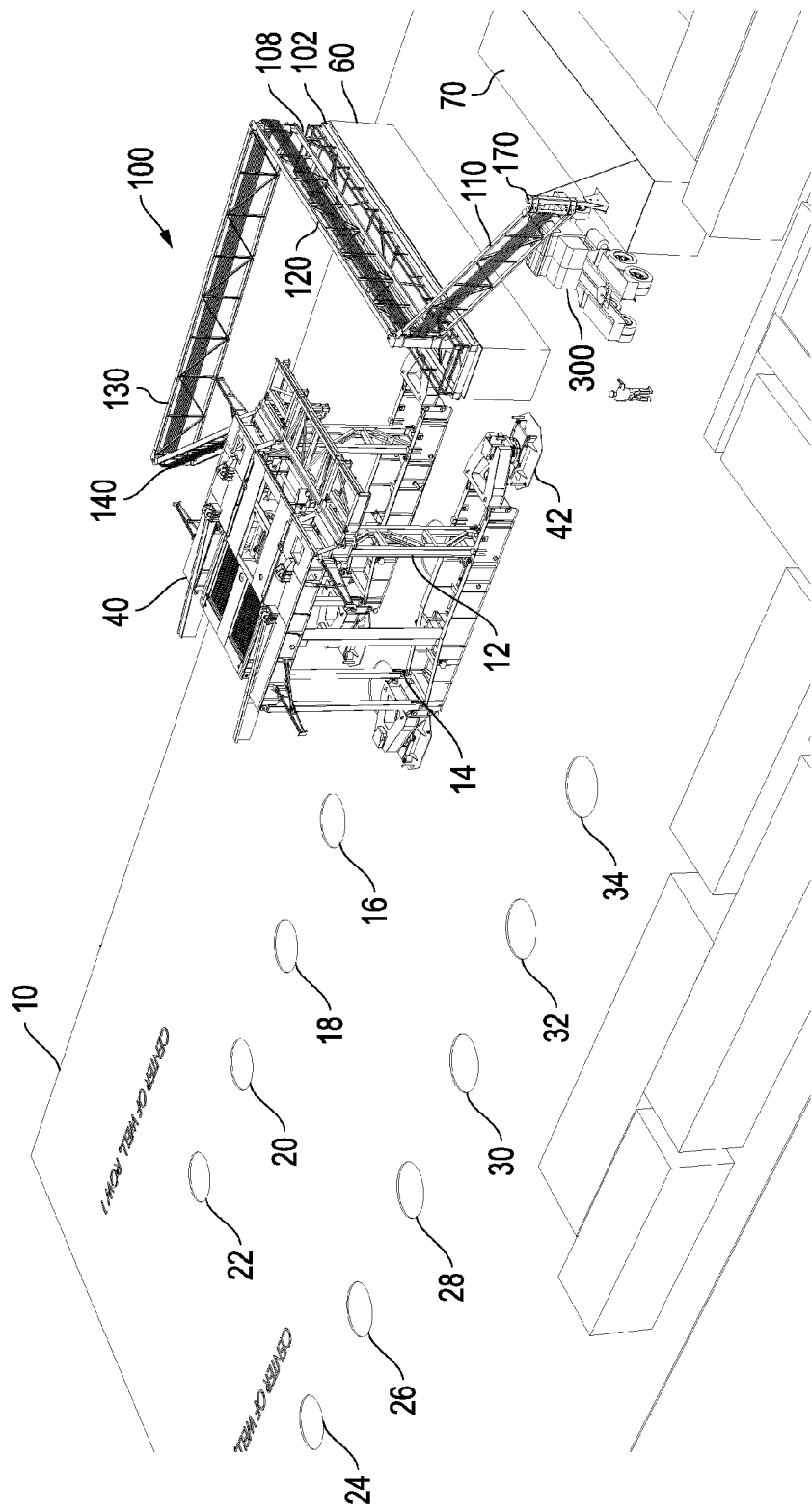
FIG. 4 is an isometric view of the service line positioning system, illustrated as connected between a drilling rig and a supply source and deployed over a nearby well bore.

FIG. 4 is an isometric view of service line positioning system 100, illustrated as connected between drilling rig 40 and a supply source 210 (not shown), and deployed over a nearby well bore 12 of a lease 10. For clarity, rig 40 is shown without a mast. As illustrated, lease 10 may have a plurality of well bores. In the embodiment illustrated, well bores 12, 14, 16, 18, 20, 22, 24, 26, 28, 30, 32, and 34 are all present on lease 10. The numbering of the well bores is not intended to reflect an order by which they must be drilled. This is common in conventional drilling, where it has proven more economical to drill multiple wells directionally from a single lease 10.

In this practice, drilling rig 40 may be equipped with translation pods 42 for moving rig 40 without the need to disassemble rig 40. The problem solved by the several embodiments of the present invention is the need to extend service lines 200 with the movement of drilling rig 40, and to do so in an economic manner and, most preferably, without interfering with ground traffic.

As illustrated in FIG. 4, skid 102 is elevated and mounted on a structure 60. Structure 60 can be any structure capable of supporting the weight of system 100. First panel 110 is deployed and extended outward from skid 102. A source post 170 is located on a second structure 70. Structure 70 can be any structure capable of supporting the weight of system 100. As an example, and not by way of limitation, structure 70 can be a variable frequency drive house or "VFD."

First end 112 of first panel 110 is connected to source post 170. Service lines 200 extend beyond first end 112 of first panel 110 for connection to a junction box, or for direct connection to the supply system for the service line 200, such as a generator, pump, compressor, or other source (service line 200 extension and connections not illustrated). As illustrated, elevation of skid 102 and supply post 170 permits a vehicle 300 to maneuver between structures 60 and 70 without interfering with service lines 200.

Second panel 120 remains in the retracted position. First end 122 of second panel 120 is pivotally connected to skid post 104. Second end 124 of second panel 120 is illustrated in latched position to prevent movement of second panel 120 when drilling rig 40 is positioned over nearby well bore 12 for drilling. In this position, second end 124 of second panel 120 may be supported by latch post 108, or by guide rail 106.

Third panel 130 is shown in the deployed position. Optionally, a pedestal 180 (not shown) may be used to help support the weight of third panel 130 and fourth panel 140 during initial connection of fourth panel 140 to drilling rig 40. Alternatively, commonly present drilling rig equipment, such as a mast headache rack, may serve as pedestal 180. Optionally, pedestal 180 may remain in place during drilling operations to add stability to system 100.

Figure 5:
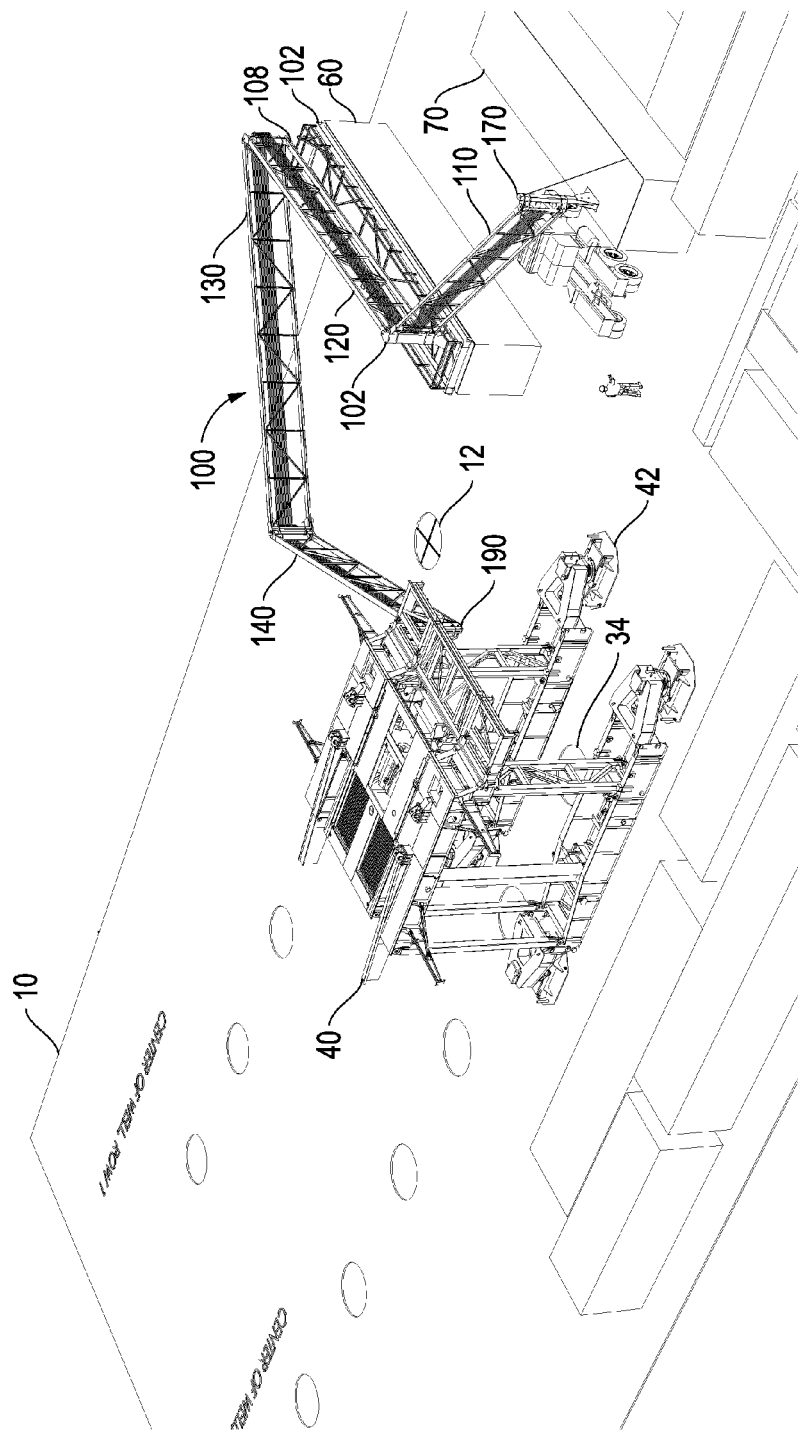
FIG. 5 is an isometric view of the service line positioning system, illustrated as connected between a drilling rig and a supply source and deployed over a well bore located at a further distance.

FIG. 5 is an isometric view of service line positioning system 100 deployed over well bore 34, which is located at a distance further away from skid 102. In FIG. 5, drilling rig 40 has been relocated over well bore 34, such as by use of translation pods 42. System 100 has permitted service lines 200 to remain connected, and thus provide continuous power for the relocation of drilling rig 40, and to be ready for all drilling operations at well bore 34.

During relocation of drilling rig 40 between well bore 12 and well bore 34, it remains unnecessary to deploy second panel 120. However, deployment is optional.

Figure 6:
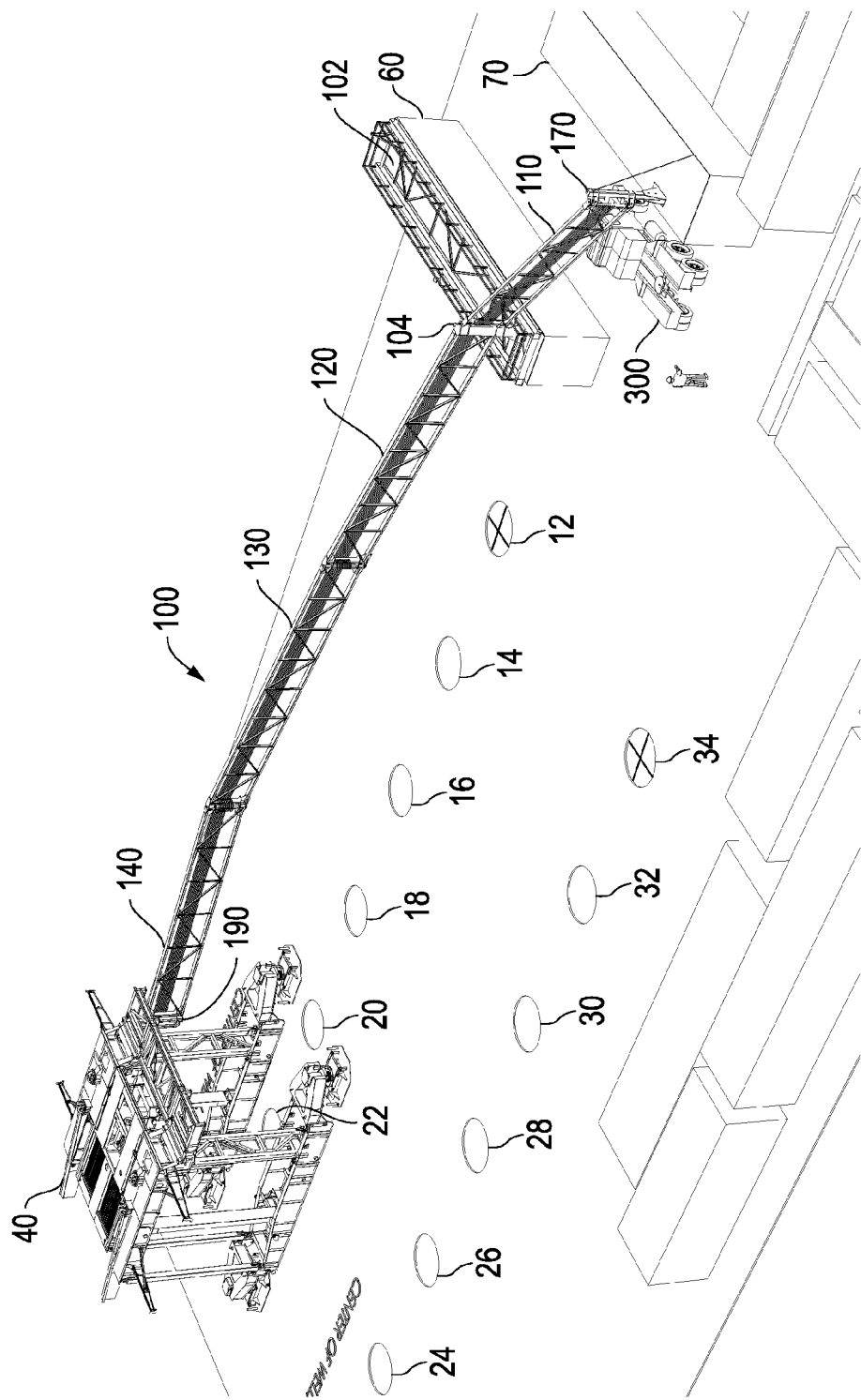
FIG. 6 is an isometric view of the service line positioning system, illustrated as connected between a drilling rig and a supply source and deployed over a well bore that is on the location, but remote to the skid.

FIG. 6 is an isometric view of service line positioning system 100 deployed over well bore 22, which is located at a distance far away from skid 102. In FIG. 6, drilling rig 40 has been relocated over well bore 22, such as by use of translation pods 42. System 100 has permitted service lines 200 to remain connected, and thus provide continuous power for the relocation of drilling rig 40, and to be ready for all drilling operations at well bore 22.

During relocation of drilling rig 40 between well bore 34 and well bore 22, it is necessary to deploy second panel 120. If used, latch post 108 is disengaged from strike 109 to allow second panel 120 to pivot freely about skid post 104. As illustrated, system 100 is in near to full extension. During such lengthy extension, pedestal 180 may be located beneath third panel 130 for additional support. In another embodiment, pedestal 180 may be a wheeled device, such that it relocates independently when rig 40 is relocated.

In this embodiment, first panel 110 and second structure 70 act as a counterbalance to the weight of fully extended second panel 120, third panel 130, and fourth panel 140. As such, it is preferable to locate source post 170 near to the center of gravity of second structure 70. It is also preferable that second structure 70 weigh about 10,000 pounds or greater. It is also preferable to locate first panel 110 generally perpendicular to skid 102.

As illustrated in FIGS. 3, 5, and 6, panels 150 are deployed in a horizontal plane. As best seen in FIG. 6, first panel 110 is deployed in a first direction from skid 102, and second panel 120 is deployed in a second direction from skid 102 that is different from the first direction of first panel 110.

In the embodiment illustrated in which four panels 150 are utilized, an extension of 150 feet or greater may be achieved. In an alternative embodiment in which three panels are utilized, an extension of 100 feet or greater may be achieved.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A service line positioning system for use with a drilling rig where pad drilling will require the drilling rig to move relatively short distances, the service line positioning system comprising:
   a transportable skid;
   a skid post extending above the skid;
   a first panel having a first end pivotally connected to the skid post and an opposite second end;
   the second end movable along a first arc direction from above the transportable skid to a position connectable to a source cost above a source skid;

a second panel having a first end pivotally connected to the skid post, and a second end movable along a second arc direction opposite to the first arc direction of the first panel;

a third panel having at least one end pivotally connected to the second end of the second panel;

each panel supportable of a plurality of service lines that extend between the panels; and, the panels being movable between a retracted position above the skid and a deployed position extending beyond the skid.

2. The service line positioning system of claim 1, further comprising:

extension of the panels between the retracted position and extended position occurs in a substantially horizontal plane.

3. The service line positioning system of claim 1, further comprising:

the panels being retractable in folding relationship such that the supply lines are exterior to the folded connection between the panels.

4. The service line positioning system of claim 1, further comprising:

the skid being mountable above ground level so as to provide clearance beneath at least one deployed panel sufficient to provide vehicular passage beneath the deployed panel.

5. The service line positioning system of claim 1, further comprising:

a latching mechanism to secure a panel in the retracted position above the skid for transportation.

6. The service line positioning system of claim 5, further comprising:

the latch post supporting a portion of the weight of the releasably connected panel when the panel is connected to the latch post.

7. The service line positioning system of claim 1, further comprising:

the skid post located proximate to a first end of the skid;

a latch post located proximate to an opposite second end of the skid; and, a panel pivotally connected to the skid post on one end, and releasably connected to the latch post on its opposite end.

8. The service line positioning system of claim 1, further comprising:

a rig post located between a base box and side box of a drilling rig; and, a panel having one end pivotally connected to the rig post.

9. The service line positioning system of claim 8, further comprising:

the rig post being removably connectable to the drilling rig.

10. The service line positioning system of claim 9, further comprising:

the weight of the source skid being sufficient to counterbalance a portion of the weight of the panels deployed between the transportable skid and the drilling rig.

11. The service line positioning system of claim 8, further comprising:

the source post, skid post, and rig post being positioned in substantially vertical, and substantially parallel orientation with respect to each other;

the skid post being connected to a panel; and, the source post and the rig post each being connectable to a panel.

12. The service line positioning system of claim 1, further comprising:

a rig post located between the base box and side box of a drilling rig; and, a panel being pivotally connectable to the rig post when the panel is in a deployed position.

13. The service line positioning system of claim 1, further comprising:

the source skid comprising a source connection for the service lines.

14. The service line positioning system of claim 13, further comprising:

the source post connected proximate to the center of gravity of the source skid, such that the weight of the source skid counterbalances the weight of the panels deployed between the skid and the drilling rig.

15. The service line positioning system of claim 1, further consisting of:

three panels extendable into a deployed end-to-end configuration that extends at a length of at least 100 feet.

16. The service line positioning system of claim 1, further consisting of:

four panels extendable into a deployed end-to-end configuration that extends at a length of at least 150 feet.

17. A service line positioning system for use with a drilling rig where pad drilling will require the drilling rig to move relatively short distances, the service line positioning system comprising:

a transportable skid having a skid post and a latch post;

a source skid having a source post located proximate to a source connection of the service lines;

a rig post attached to a drilling rig;

a first, second, and third panel, each having a first and second end;

the first panel detachably connectable at its first end to the source post, and pivotally connected at its opposite end to the skid post;

a second panel pivotally connected at its first end to the skid post, and detachably connected to the latch post at its second end; and, a third panel, pivotally connected at its first end to the second end of the second panel, and pivotally connected at its second end to the rig post.

\* \* \* \* \*